(12) United States Patent
Anabuki et al.

(10) Patent No.: US 7,558,689 B2
(45) Date of Patent: Jul. 7, 2009

(54) INFORMATION PROCESSING METHOD AND SYSTEM

(75) Inventors: Mahoro Anabuki, Cambridge, MA (US); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 11/126,919

(22) Filed: May 11, 2005

(65) Prior Publication Data

US 2005/0253871 A1    Nov. 17, 2005

(30) Foreign Application Priority Data

May 14, 2004    (JP)    ............................. 2004-144783

(51) Int. Cl.
*G01C 17/38*    (2006.01)
(52) U.S. Cl. .......................... 702/94; 702/150; 382/106
(58) Field of Classification Search ................... 702/85, 702/94, 95, 150–154; 345/158, 162, 7–9; 382/106, 107, 176, 196
See application file for complete search history.

(56) References Cited

U.S. PATENT DOCUMENTS

2002/0103617 A1*    8/2002    Uchiyama et al. ........... 702/150
2002/0105484 A1*    8/2002    Navab et al. .................... 345/8
2003/0080976 A1    5/2003    Satoh
2003/0080979 A1    5/2003    Satoh
2005/0068293 A1    3/2005    Satoh

OTHER PUBLICATIONS

T. Hollerer, et al., Situated documentaries: embedding multimedia presentations in the real world, Proc. International Symposium on Wearable Computers'99, pp. 79 to 86, 1999.
D. G. Lowe: Fitting parameterized three-dimensional models to images, IEEE Transactions on PAMI, vol. 13, No. 5, pp. 441 to 450, 1991.

* cited by examiner

*Primary Examiner*—Manuel L Barbee
(74) *Attorney, Agent, or Firm*—Canon U.S.A. Inc., I.P. Division (57) ABSTRACT

An information-processing system for calibrating an orientation sensor mounted on an image-pickup device calculates a relative orientation between the orientation sensor and the image-pickup device by using information about image coordinates of indices detected from a photographed image and an orientation-measurement value. At the same time, the information-processing system obtains parameters for minimizing an error between actual measured values of the image coordinates of the indices and theoretical values of the image coordinates of the indices, where the theoretical values are calculated from estimates of unknown parameters, by using a position of the image-pickup device and the relative orientation between the orientation sensor and the image-pickup device, as the unknown parameters.

12 Claims, 2 Drawing Sheets

FIG. 1

INFORMATION PROCESSING METHOD AND SYSTEM

BACKGROUND OF THE INVENTION

1. Field of the Invention

The present invention calibrates the orientation of an orientation sensor mounted on an image-pickup device with reference to the image-pickup device in order to measure the orientation of the image-pickup device.

2. Description of the Related Art

In recent years, mixed reality (MR) for coupling real space to virtual space and eliminating the joint therebetween has been actively studied. For example, a known image-display device for presenting the MR is formed, as a device for producing a display image generated by superposing the image of virtual space generated according to the position and orientation of the image-pickup device (a virtual object, text information, and so forth that are drawn by computer graphics or the like) on the image of real space that is picked up by an image-pickup device such as a video camera.

The image-display device may have applicability in navigation for overlaying the name and/or guide information of a famous building or the like on an image obtained by photographing a built-up area on the real-space as a virtual-space image. Further, the image-display device may also have applicability in view simulation for superposing a computer-graphics image of a building to be constructed on an image obtained by photographing the construction site of the building.

A common problem occurs regarding how precisely registration between the real space and the virtual space can be attained in a case in which the image-display device is applied to the navigation and a case in which the image-display device is applied to the view simulation. Therefore, considerable research has been done for solving the problem. For performing the registration between the real space and the virtual space, camera parameters (intrinsic parameters and extrinsic parameters) for generating an image of the virtual space are synchronized with camera parameters of the image-pickup device at all times. Where intrinsic parameters of the image-pickup device are known, the registration problem of the MR is attributed to the problem of extrinsic parameters of the image-pickup device, that is, the acquisition of the position and orientation of the image-pickup device in a world-coordinate system that is set in the real space.

T. Hollerer, S. Feiner, and J. Pavlik, Situated documentaries: embedding multimedia presentations in the real world, Proc. International Symposium on Wearable Computers '99, pp. 79 to 86, 1999 discloses a method for obtaining the position and orientation of an image-pickup device by measuring the orientation of the image-pickup device by using an orientation sensor and measuring the position of the image-pickup device by using a global-positioning system or the like, as the method for obtaining the position and orientation of the image-pickup device in the world-coordinate system that is set in the real space.

TISS-5-40 of TOKIMEC INC. and InertiaCube2 of InterSense of the U.S. are used, as representative examples of the orientation sensor used for the above-described method. Each of the above-described orientation sensors mainly includes three gyrosensors for detecting an angular speed in each of three-axis directions and three acceleration sensors for detecting an acceleration in each of the three-axis directions, and measures three-axis orientations including an azimuth angle, a pitch angle, and a roll angle by using the angular-rate measured values and the acceleration measured values in combination. Usually, the angular information obtained only by the gyrosensor only shows a relative change in the orientation with respect to the orientation at a predetermined time. However, each of the above-described orientation sensors can calculate absolute angles of inclination, where the angles of inclination include the pitch angle and the roll angle, with reference to the gravitational direction by measuring the Earth's gravitational direction by using the acceleration sensor.

The orientation-measured value transmitted from the orientation sensor represents the orientation thereof in a sensor-coordinate system that is defined by the orientation sensor independently of the world-coordinate system. In the case of the above-described TISS-5-40, for example, the sensor-coordinate system is defined, where the gravitational direction (downward direction) is determined to be the Z-axis, and the orientation-sensor front direction in an X-Y plane defined by the Z-axis at the time when the orientation sensor is initialized, is defined as the X-axis. Further, in the case of the above-described InertialCube2, the sensor-coordinate system is defined, where the gravitational direction (downward direction) is determined to be the Z-axis, and the north direction in an X-Y plane defined by the Z-axis that is pointed by an internal geomagnetic sensor, at the time where the orientation sensor is initialized, is defined as the X-axis. Thus, it is usual that the orientation-measured values measured by the orientation sensor do not represent the orientation of an object to be measured (the image-pickup device in the case where the image-display device for presenting the MR is used) in the world-coordinate system, that is, information to be acquired.

That is to say, since the orientation-measured value obtained by the orientation sensor cannot be used in its original format, as a value representing the orientation of the object to be measured in the world-coordinate system, coordinate transformation of some kind may have to be performed. More specifically, coordinate transformation for converting the orientation of the orientation sensor into that of the object to be measured (hereinafter referred to as local-transform) and coordinate transformation for converting the orientation of the orientation sensor in the sensor-coordinate system into that of the orientation sensor in the world-coordinate system (hereinafter referred to as world-transform) may have to be performed.

The world-transform is defined by the orientation of the sensor-coordinate system with reference to the world-coordinate system. Moreover, the local-transform is defined by the orientation of the orientation sensor with reference to the coordinate system defined by the image-pickup device.

As has been described, the sensor-coordinate system is determined according to the gravitational direction. Therefore, in which direction the gravitation axis of the sensor-coordinate system (the Z-axis in the cases of TISS-5-40 and InertiaCube2) points in the world-coordinate system can be uniquely determined according to the definition of the gravitational direction in each of the sensor-coordinate system and the world-coordinate system. By using the above-described information, the world-transform can be obtained, where the rotation angle around the gravitation axis, i.e. azimuth, is kept in an unstable state. More specifically, a three-dimensional vector 1 showing a vertically-upward direction in the world-coordinate system and a three-dimensional vector g showing a vertically-upward direction in the sensor-coordinate system are determined and an angle β which the three-dimensional vector 1 forms with the three-dimensional vector g is calculated based on the inner product g·1 of the three-dimensional vector g and the three-dimensional vector 1. Further, a normal vector n=g×1 of a plane formed by both the vectors is calculated based on the outer product of the three-dimensional vector g and the three-dimensional vector 1. Where a rotation matrix $R^*_{WC}$ for performing coordinate transformation, where vector n is determined to be the rotation axis and the angle β is determined to be the rotation angle, is calculated, the rotation matrix $R^*_{WC}$ denotes the orientation of the axis corresponding to the gravitational direction with reference to the world-coordinate system.

The applicant of the present invention proposed the above-described method for calculating the world-transform in U.S. Patent Application Publication No. 20050068293 filed Sep. 30, 2004.

In the case of the world-transform, only a rotation angle around the gravitation axis, i.e. azimuth, is unknown.

The above-described unknown parameter is geometrically equivalent to an "azimuth-drift error" or an accumulated error of the orientation-measured value around the gravitation axis. The azimuth-drift error occurs with the passage of time, where the orientation sensor is the gyrosensor. Therefore, when the rotation angle around the gravitation axis in world-transform is considered, as the "initial value of the azimuth-drift error", the unknown parameter can be considered, as part of the azimuth-drift error of the gyrosensor, where the azimuth-drift error changes dynamically. As a result, the world-transform can be considered, as a known value that can be derived based on the relationship between the gravitation axes. Further, automatic measurement (automatic correction) of the azimuth-drift error can be performed according to known methods using image information, so long as the local-transform is known.

However, no methods have been proposed for easily and correctly deducing the local-transform wanted to be known. Hereinafter, the task for deducing the local-transform of the orientation sensor is referred to as "sensor calibration", or simply "calibration".

For example, according to one of calibration methods that have been used, an operator adjusts each of the values by trial and error until correct registration is achieved by increasing and/or decreasing the values of parameters representing the local-transform in an interactive manner through an input unit of some kind. However, the above-described method is difficult to perform. Further, according to another method of the calibration methods that have been used, the image of a virtual object generated based on a predetermined orientation is produced and shown on an image-display device and the operator adjusts the orientation of the image-pickup device by visually checking the orientation so that the positional relationship between the shown virtual object and the real space becomes correct. Then, the above-described two coordinate transformations are calculated based on an output currently transmitted from the orientation sensor. The above-described method is disclosed in U.S. Patent Application Publication No. 20030080979, filed Oct. 21, 2002. Although this method is easier to perform than the method where the parameter values are adjusted in the interactive manner, it is dependent on the visual check of the operator. Therefore, this method is susceptible to improvement in correctness and reproducibility.

SUMMARY OF THE INVENTION

Accordingly, the present invention easily and correctly obtains the orientation of an orientation sensor mounted on an image-pickup device with reference to the image-pickup device.

The present invention provides an information-processing method for obtaining a predetermined parameter for calibrating an orientation sensor mounted on an image-pickup device. The information-processing method includes steps of inputting an image photographed by the image-pickup device, inputting an orientation-measurement value measured by the orientation sensor, detecting information about image coordinates of an index from the photographed image, and calculating sensor-calibration information, so as to calculate a relative orientation between the orientation sensor and the image-pickup device by using the orientation-measurement value and the detected information about the image coordinates of the index. In the step of calculating the sensor-calibration information, the predetermined parameter is obtained based on an error between an actual-measured value of the image coordinates of the index corresponding to the detected information about the image coordinates of the index and a theoretical value of the image coordinates of the index, the theoretical value being calculated from an estimate of an unknown parameter, by using the relative orientation and a position of the image-pickup device, as the unknown parameter.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Exemplary embodiments of the present invention are described with reference to the accompanying drawings.

First Embodiment

A sensor-calibration device according to a first embodiment of the present invention calculates coordinate transformation for converting the orientation of a sensor to that of an image-pickup device. Further, the sensor-calibration device presents mixed reality generated by using a calibration result for verifying the calibration result. The sensor-calibration device and a sensor-calibration method according to the first embodiment are described below.

Figure 1:
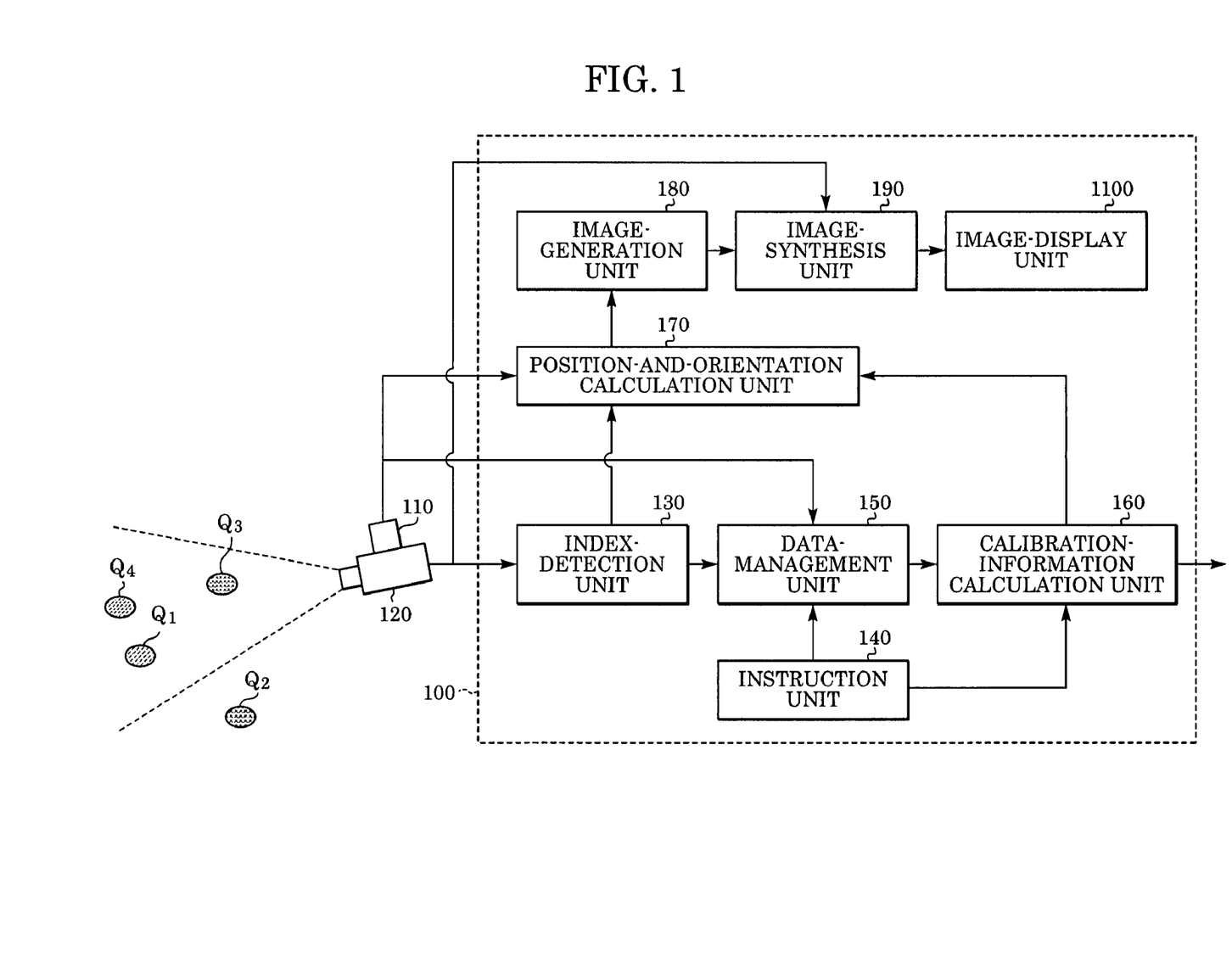
FIG. 1 shows a configuration of a sensor-calibration device.

FIG. 1 shows the configuration of a sensor-calibration device 100 according to the first embodiment. As shown in FIG. 1, the sensor-calibration device 100 is connected to an orientation sensor 110 targeted for calibration and an image-pickup device 120 on which the orientation sensor 110 is mounted. The sensor-calibration device 100 includes an index-detection unit 130, an instruction unit 140, a data-management unit 150, a calibration-information calculation unit 160, a position-and-orientation calculation unit 170, an image-generation unit 180, an image-synthesis unit 190, and an image-display unit 1100.

The orientation sensor 110 targeted for calibration measures the orientation thereof in the sensor-coordinate system. The orientation sensor 110 includes clinometers (not shown) that can measure the terrestrial-gravity direction. One of the axes of the sensor-coordinate system (the z-axis in this embodiment) is set, so as to extend in a direction opposite to the terrestrial gravity. A three-degree-of-freedom orientation measured value is obtained and transmitted to the data-management unit 150 according to a request issued by the data-management unit 150.

A plurality of reference indices $Q_k$ (where k=1 ... K) is provided at a plurality of positions in real space, as indices used for photographing by using the image-pickup device 120. Here, the positions of the reference indices $Q_k$ in the world-coordinate system are known. In the world-coordinate system, a single point in the real space is defined, as an origin and three axes that are orthogonal to one another are defined, as the x-axis, the y-axis, and the z-axis. The number of the reference indices $Q_k$ is preferably at least three, so as to be observed by the image-pickup device 120 at the time when the image-pickup device 120 obtains sensor-calibration data. In FIG. 1, four reference indices $Q_1$, $Q_2$, $Q_3$, and $Q_4$ are provided and three of them, that is, reference indices $Q_1$, $Q_3$, and $Q_4$ are included in the view field of the image-pickup device 120.

The reference indices $Q_k$ may be provided, as circular markers that are different in color from one another, or feature points such as natural features that are different from one another, for example, texture. Further, the reference indices $Q_k$ may be provided, as rectangular markers, where each of the rectangular markers is formed, as a monochrome area of a predetermined size. That is to say, the reference indices $Q_k$ may be provided in any form, so long as the reference indices $Q_k$ can be used for detecting the image coordinates of a projection image on a photographed image and distinguished from one another.

An image (hereinafter referred to as a photographed image) externally transmitted from the image-pickup device 120 is transmitted to the index-detection unit 130.

Upon receiving the photographed image transmitted from the image-pickup device 120, the index-detection unit 130 detects the image coordinates of the reference indices $Q_k$ shown in the transmitted photographed image. For example, in the case where the reference indices $Q_k$ are formed, as the markers that are different in color from one another, the index-detection unit 130 detects areas corresponding to the colors of the markers shown on the photographed image and determines the gravity positions of the markers, as detected coordinates of the reference indices $Q_k$.

Further, in the case where the reference indices $Q_k$ are provided, as the features that are different in texture from one another, the index-detection unit 130 performs template matching on the photographed image by using template images of the indices, thus detecting the positions of the reference indices $Q_k$. Here, the template images had already been stored, as known information.

Further, in the case where the reference indices $Q_k$ are provided, as the rectangular indices, the index-detection unit 130 performs binarization for the photographed image and further performs labeling for the binarized photographed image. Then, the index-detection unit 130 detects an object formed by four lines from within an area of a predetermined size, as an index candidate. Further, the index-detection unit 130 determines whether or not a predetermined pattern exists in a candidate area, so as to eliminate error detection and obtain the identifier of an index. Here, in this embodiment, the rectangular index detected in the above-described manner is considered, as four indices formed as four vertices.

Image coordinates $u^{Qkn}$ and the identifier $k_n$ thereof of the detected reference index $Q^{kn}$ are transmitted to the data-management unit 150 according to a request issued from the data-management unit 150. Here, the sign n (n=1 ... N) denotes an index corresponding to each of the detected indices and the sign N denotes the tonal number of detected indices. In the case of FIG. 1, an expression N=3 holds, and identifiers $k_1=1$, $k_2=3$, and $k_3=4$ and the image coordinates $u^{Qk1}$, $u^{Qk2}$, and $u^{Qk3}$ corresponding thereto are externally transmitted, for example.

Upon receiving a data-acquisition command transmitted from an operator (not shown), the instruction unit 140 transmits an instruction "acquire data" to the data-management unit 150. Further, upon receiving a calibration-information calculation command, the instruction unit 140 transmits an instruction "calculate calibration information" to the calibration-information calculation unit 160. A command can be transmitted to the instruction unit 140 by pressing down a key allotted for a predetermined command of a keyboard, for example. It is to be noted that the command transmission can be performed by using any method. For example, a graphical-user interface (GUI) shown on a display screen can be used for transmitting commands.

Upon receiving the instruction "acquire data" transmitted from the instruction unit 140, the data-management unit 150 receives an orientation-measured value transmitted from the orientation sensor 110 and the image coordinates and the identifier thereof of the reference index that are transmitted from the index-detection unit 130. Then, the data-management unit 150 generates a set of the orientation-measured value (the image coordinates of the reference index, the identifier of the reference index) for each of the detected indices. Further, the data-management unit 150 adds the set to a single data list so that the set is held therein. Here, the orientation-measured value transmitted from the orientation sensor 110 is obtained at the same time as when the photographed image is imaged. It is to be noted that the image coordinates of the reference index transmitted from the index-detection unit 130 are detected from the photographed image. Further, the data-management unit 150 transmits the generated data list to the calibration-information calculation unit 160 according to a request issued from the calibration-information calculation unit 160.

Upon receiving the instruction "calculate calibration information" transmitted from the instruction unit 140, the calibration-information calculation unit 160 receives the data list transmitted from the data-management unit 150, performs calibration based on the data list, and externally transmits resultant calibration information, that is, local-transform. Otherwise, the calibration-information calculation unit 160 may externally transmit the latest azimuth-drift-error correction value that is obtained when the calibration information is calculated.

Thus, the above-described part of this embodiment allows calculating the orientation of the orientation sensor 110 mounted on the image-pickup device 120 with reference to the image-pickup device 120. The part of this embodiment described next describes how to present mixed reality shown for verifying the calibration result.

The position-and-orientation calculation unit 170 receives the orientation-measured value transmitted from the orientation sensor 110, the image coordinates and the identifier thereof of the reference index that are transmitted from the index-detection unit 130, and the calibration information transmitted from the calibration-information calculation unit 160. Then, the position-and-orientation calculation unit 170 calculates the position and orientation of the image-pickup device 120 in the world-coordinate system by using the above-described transmitted information sets in combination.

According to the method described herein, first, the position-and-orientation calculation unit 170 sets an initial estimate for each of the azimuth-drift-error correction value of the orientation sensor 110 and the position of the image-pickup device 120 in the world-coordinate system. The initial estimates may be input in an interactive manner by the operator in an initial frame, for example, or the result of optimization performed in the previous frame may be used, as the initial estimates. Otherwise, an estimate obtained through the processing performed by the calibration-information calculation unit 160 may be input and set. Subsequently, the position-and-orientation calculation unit 170 calculates the position and orientation of the image-pickup device 120 in the world-coordinate system, based on the azimuth-drift-error correction value of the orientation sensor 110 and the estimate of the position of the image-pickup device 120 in the world-coordinate system that are set according to the above-described manner. Here, the orientation of the image-pickup device 120 in the world-coordinate system is calculated, based on the local-transform, that is, the calibration information transmitted from the calibration-information calculation unit 160, the world-transform that can be uniquely determined according to the definition of the gravitation direction in each of the sensor-coordinate system and the world-coordinate system, the estimate of the azimuth-drift-error correction value, and the orientation-measured value transmitted from the orientation sensor 110.

Then, the difference between the theoretical values of the image coordinates of the reference index calculated based on the position and orientation, and the measurement values of the image coordinates of the reference index is minimized through repeated calculation according to the Gauss-Newton method using an image Jacobian. Subsequently, the estimate of each of the azimuth-drift-error correction value of the orientation sensor 110 and the position of the image-pickup device 120 in the world-coordinate system is optimized. Further, the position and orientation of the image-pickup device 120 in the world-coordinate system are calculated based on the obtained estimates and transmitted to the image-synthesis unit 190.

Thus, the orientation of the image-pickup device 120 is calculated based on the assumption that the given local-transform is correct, as in the above-described manner. Subsequently, the obtained orientation of the image-pickup device 120 reflects the correctness of the local-transform.

Upon receiving the information about the position and orientation of the image-pickup device 120 in the world-coordinate system transmitted from the position-and-orientation calculation unit 170, the image-generation unit 180 generates a virtual-space image corresponding to virtual-space part of the image presenting the mixed reality viewed from the above-described position and orientation. The generated virtual-space image is transmitted to the image-synthesis unit 190.

The image-synthesis unit 190 receives the photographed image transmitted from the image-pickup device 120 and the virtual-space image transmitted from the image-generation unit 180, and merges the two images into a single image, thus generating an image showing the mixed reality. The generated image showing the mixed reality is transmitted to the image-display unit 1100.

The image-display unit 1100 receives the image showing the mixed reality transmitted from the image-synthesis unit 190 and displays the image, so as to present the mixed reality to the operator. The operator can determine the accuracy of the calibration result based on the accuracy of registration between the real space and the virtual space in the shown mixed reality. The image-display unit 1100 may be integral with the image-pickup device 120. In that case, the image-pickup device 120 and the image-display unit 1100 may be used, as a head-mounted display.

Figure 2:
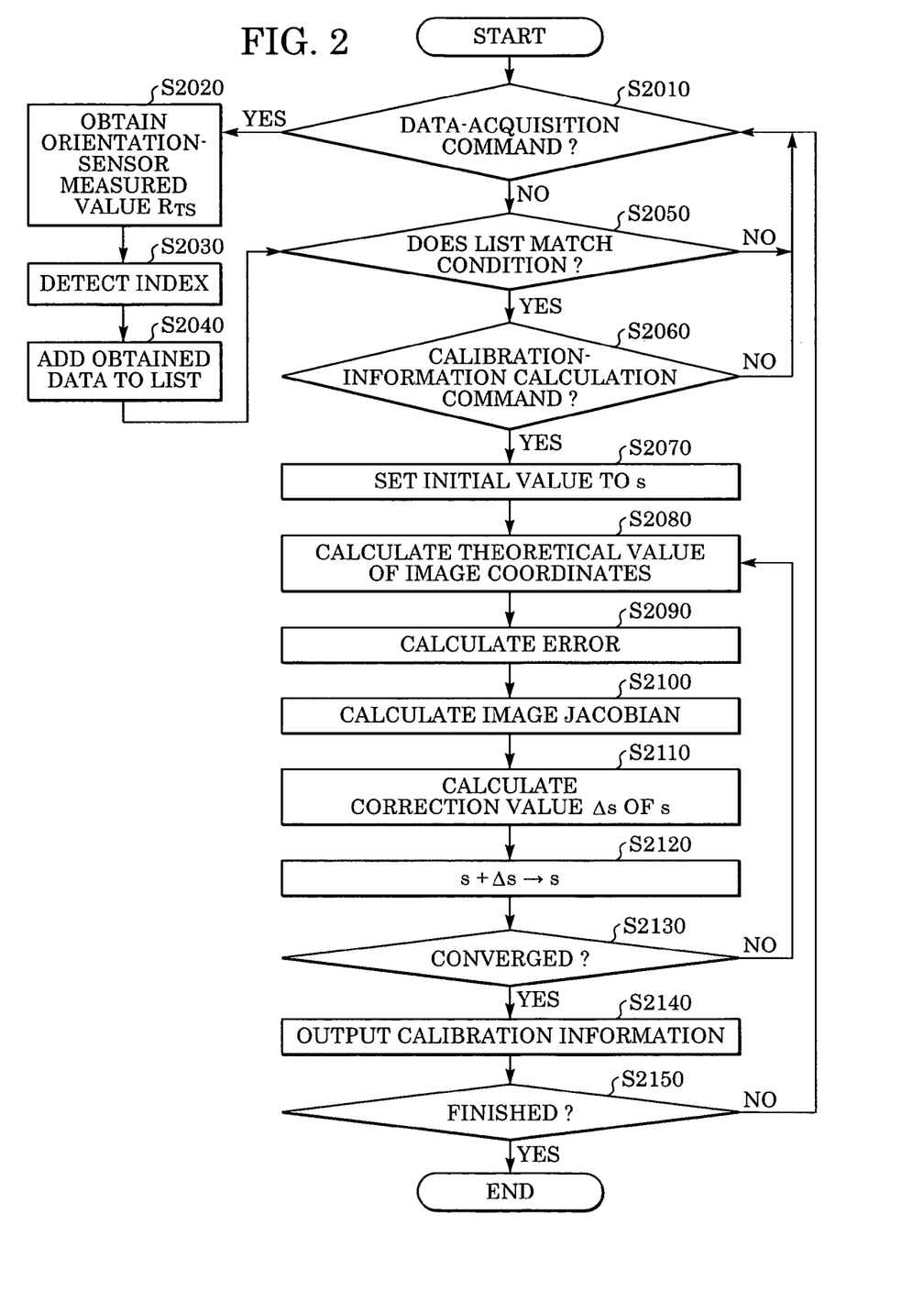
FIG. 2 is a flowchart showing processing procedures performed according to a sensor-calibration method.

FIG. 2 is a flowchart illustrating processing procedures performed by the sensor-calibration device 100 for obtaining the calibration information. Program code pursuant to the flowchart is stored in a memory (not shown) such as a RAM (random access memory), a ROM (read-only memory), and so forth in the sensor-calibration device 100 and read and executed by a CPU (central processing unit) (not shown) in the sensor-calibration device 100.

At step S2010, the instruction unit 140 determines whether or not the data-acquisition command is transmitted from the operator. In the case where the image-pickup device 120 is placed at the position where sensor-calibration data is acquired, the operator transmits the data-acquisition command. In the case where the data-acquisition command is not transmitted (no at step S2010), the instruction unit 140 advances processing to step S2050 (described later). In the case where the data-acquisition command is transmitted (yes at step S2010), the instruction unit 140 advances processing to step S2020. Hereinafter, the sign $\tau$ is used, as the identifier of the time where the data-acquisition command is transmitted. In the following description, in the case where the time $\tau$ varies, it is to be understood that the position and orientation of the image-pickup device 120 vary. That is to say, the sign $\tau$ can be considered, as the identifier of the eyepoint position.

At step S2020, the data-management unit 150 receives the three-degree-of-freedom orientation measured value that is measured at the time $\tau$ and transmitted from the orientation sensor 110. The orientation-measured value is internally represented, as a three-dimensional vector. There have been proposed many methods for presenting an orientation in three values. According to this embodiment, the orientation is presented by a three-dimensional vector, where the magnitude of the vector defines the rotation angle and the orientation of the vector defines the rotation-axis direction. Hereinafter, the orientation-measurement value transmitted to the data-management unit 150, at this step, is represented by a three-dimensional vector shown by an expression $m_\tau = [\xi_{m\tau} \psi_{m\tau} \zeta_{m\tau}]^T$.

At step S2030, the data-management unit 150 receives the image coordinates $u^{Qkn}$ and the identifier $k_n$ thereof of the reference index $Q_{kn}$ detected by the index-detection unit 130 at the time $\tau$. The index-detection unit 130 performs reference-index detection for a photographed image transmitted thereto at all times. Therefore, the processing at this step allows obtaining the image coordinates of the reference index, where the orientation-measurement value of the orientation sensor 110 is $m_\tau$. Further, information transmitted from the index-detection unit 130 is not necessarily information about the entire reference indices, so long as the information is about reference indices currently detected on the photographed image.

Then, at step S2040, the data-management unit 150 adds a set of inputted data to data list L. More specifically, information about the vector $m_\tau$ transmitted from the orientation sensor 110 is represented by an expression $m_{\tau i} = [\xi_{m\tau i} \psi_{m\tau i} \zeta_{m\tau i}]^T$, the identifier $k_n$ transmitted from the index-detection unit 130 is determined to be an identifier $k_i$, and the image coordinates $u^{Qkn}$ transmitted from the index-detection unit 130 are determined to be coordinates $u_i^{Qki}$. Then, the data-management unit 150 adds a set of $[m_{\tau i}, u_i^{Qki}, k_i]$ to the data list L, as the i-th data. Here, the sign i (i=1 ... I) denotes an index corresponding to each of data sets added to the data list L and the sign $\tau i$ denotes the identifier of time on which the i-th data is transmitted. Further, the sign I denotes the number of the entire added data sets.

Thus, the data is acquired through the above-described processing procedures.

At step S2050, the data-management unit 150 determines whether or not the data list L obtained until then contains information adequate for calculating the calibration information. If it is determined that the information does not match the condition (no in step S2050), the process returns to step S2010 and the data-management unit 150 waits until another data-acquisition command is transmitted. On the other hand, if the data list L matches the condition for calculating the calibration information, the process advances to step S2060. In the case where the data list L includes the information adequate for calculating the calibration information, it means that the list L includes data on at least three different reference indices $Q_k$ that are photographed in at least two frames (two times and two eyepoint positions). However, since the diversity of transmitted data increases with increasing precision of derived calibration information, the condition may be set so that more data is demanded.

Next, at step S2060, it is determined whether or not the operator transmitted a calibration-information calculation command. If the calibration-information calculation command is transmitted (yes at step S2060), the process advances to step S2070. Otherwise, the process returns to step S2010 and the data-management unit 150 waits until another data-acquisition command is transmitted thereto.

The calibration-information calculation unit 160 handles calibration information to be acquired, that is, the local-transform, as a three-dimensional vector represented by an expression $\omega_{SC}=[\xi\ \psi\ \zeta]^T$. Further, the calibration-information calculation unit 160 internally uses the position of the image-pickup device 120 in the world-coordinate system corresponding to each time τ during the local-transform is calibrated. Here, the position of the image-pickup device 120 is represented by an expression $t_{WC\tau}=[x_{\tau}\ y_{\tau}\ z_{\tau}]^T$. Further, the calibration-information calculation unit 160 internally uses a correction value $\alpha_{\tau}$ (unknown value) of the azimuth-drift error corresponding to each time τ during the local-transform is calibrated. Hereinafter, the above-described unknown parameters are shown, as a 3+4T-dimensional state-vector s represented by an expression $s=[\omega_{SC}\ t_{WC1}\ \alpha_1\ \ldots\ t_{WC\tau}\ \alpha_{\tau}\ \ldots\ t_{WCT}\ \alpha_T]^T$. Here, the sign T denotes the number of different frames (different times and different camera pose) included in the data list L.

The calibration-information calculation unit 160 sets an initial value to the state vector s, at step S2070. The initial value was determined in advance by the operator through interactive setting operations, for example. Otherwise, the initial value of the vector $\omega_{SC}$ may be roughly determined according to the method disclosed in U.S. Patent Application Publication No. 20050068293. Further, the initial value of an azimuth-drift-error correction value $\alpha_{\tau i}$ may be roughly calculated on predetermined time by using the initial value of the vector $\omega_{SC}$.

At step S2080, the calibration-information calculation unit 160 calculates the theoretical value $u_i^{Qki'}$ of image coordinates of each of the reference indices $Q_{ki}$ for each of the entire indices i according to each data $[m_{\tau i}, u_i^{Qki}, k_i]$ (i=1, 2 ... I) in the data list L and the state vector s. Here, an expression $u_i^{Qki'}=[u_{xi}^{Qki'}, u_{yi}^{Qki'}]$ holds. Incidentally, the theoretical value denotes an image coordinate on which a reference index, whose position in the world-coordinate system is known, is projected in the case where the position and orientation of the image-pickup device 120 in the world-coordinate system are determined. Here, the orientation of the image-pickup device 120 in the world-coordinate system at the time $\tau_i$ can be calculated based on coordinate transformation performed for converting the orientation of the image-pickup device 120 in the sensor-coordinate system into that of the image-pickup device 120 in the world-coordinate system (world-transform), the orientation of the orientation sensor 110 in the sensor-coordinate system (the orientation-measurement value: $m_{\tau i}$), the azimuth-drift-error correction value $\alpha_{\tau i}$, and coordinate transformation performed for converting the orientation of the orientation sensor 110 into that of an object subjected to measurement (local-transform: $\omega_{SC}$) Therefore, the theoretical value $u_i^{Qki'}$ is calculated according to the following equation (1), where the state vector s including the position $t_{WC\tau 1}$ of the image-pickup device 120 in the world-coordinate system, the local-transform $\omega_{SC}$, and the azimuth-drift-error correction value $\alpha_{\tau i}$ that relate to the calculation of the orientation of the image-pickup device 120 in the world-coordinate system is determined to be a variable.

$$u_i^{Q_{k_i}'} = F_{\tau_i}(s) \tag{1}$$

More specifically, a function $F_{\tau i}(\ )$ is generated by the following expression for calculating a position vector $$x_{C_i}^{Q_{ki}}$$

of the reference index $Q_{ki}$, whose position in the world-coordinate system is $$x_W^{Q_{ki}},$$

in a camera-coordinate system (a coordinate system where a single point on the image-pickup device 120 is defined, as an origin point and three axes that are orthogonal to one another are defined, as the X-axis, the Y-axis, and the Z-axis) by using the state vector ($s=[\omega_{SC} t_{WC1} \alpha_1 \ldots t_{WC\tau i} \alpha_{\tau i} \ldots t_{WCT} \alpha_T]^T$), at the time where the i-th data is acquired (that is to say, where the orientation-measurement value of the orientation sensor 110 is represented as $m_{\tau i}$) is represented as:

$$x_{C_i}^{Q_{k_i}} = \begin{bmatrix} x_{C_i}^{Q_{k_i}} & y_{C_i}^{Q_{k_i}} & z_{C_i}^{Q_{k_i}} & 1 \end{bmatrix}^T \tag{2}$$
$$= \left(\Delta R(\alpha_{\tau_i}) \cdot R_{WT} \cdot R_{TS_{\tau_i}} \cdot R_{SC}(\omega_{SC})\right)^{-1} \cdot \left(x_W^{Q_{k_i}} - t_{WC_{\tau_i}}\right)$$

and the following equation (3) for calculating the image coordinates $$u_i^{Qki'}$$

of the reference index $Q_{ki}$ based on the position $$x_{C_i}^{Q_{ki}}:$$

$$u_i^{Q_{k_i}'} = \begin{bmatrix} u_{xi}^{Q_{k_i}'} & u_{yi}^{Q_{k_i}'} \end{bmatrix}^T \quad (3)$$

$$= \begin{bmatrix} -f_x \dfrac{x_{C_i}^{Q_{k_i}}}{z_{C_i}^{Q_{k_i}}} & -f_y \dfrac{y_{C_i}^{Q_{k_i}}}{z_{C_i}^{Q_{k_i}}} \end{bmatrix}^T$$

In the above-described expression, the sign $f_x$ and the sign $f_y$ denote focus distances of the image-pickup device 120 in the x-axis direction and the y-axis direction. The focus distances $f_x$ and $f_y$ are stored in advance, as known values.

The sign $R_{WT}$ denotes a three-by three rotation matrix representing the world-transform, that is, a parameter that can be uniquely determined according to the definition of gravity direction in each of the sensor-coordinate system and the world-coordinate system. The three-by three rotation matrix is stored in advance, as a known value.

The sign $\Delta R(\alpha_{\tau i})$ denotes the three-by three rotation matrix where rotation by as much as $\alpha_{\tau i}$ is added to the azimuth-angle direction and is defined by the following expression (4):

$$\Delta R(\alpha) = \begin{bmatrix} l_1 l_1 (1-\cos\alpha) + \cos\alpha & l_2 l_1 (1-\cos\alpha) - l_3\sin\alpha & l_3 l_1 (1-\cos a) + l_2\sin\alpha \\ l_1 l_2 (1-\cos\alpha) + l_3\sin\alpha & l_2 l_2 (1-\cos\alpha) + \cos\alpha & l_3 l_2 (1-\cos a) - l_1\sin\alpha \\ l_1 l_3 (1-\cos\alpha) - l_2\sin\alpha & l_2 l_3 (1-\cos\alpha) + l_1\sin\alpha & l_3 l_3 (1-\cos a) + \cos\alpha \end{bmatrix} \quad (4)$$

Here, a vector $l=[l_1 l_2 l_3]^\tau$ denotes a known vector representing a vertically-upward direction in the world-coordinate system (direction opposite to the terrestrial gravity).

The sign $R_{TS\tau i}$ denotes a three-by three rotation matrix that corresponds to the orientation-measurement value calculated at the time $\tau_i$, where the i-th data is acquired, and that is defined, according to $m_{\tau i}$, by the following expression (5):

$$R_{TS_{\tau i}} = \begin{bmatrix} \dfrac{\xi_{m_{\tau i}}^2}{\theta^2}(1-\cos\theta) + \cos\theta & \dfrac{\xi_{m_{\tau i}}\psi_{m_{\tau i}}}{\theta^2}(1-\cos\theta) - \dfrac{\zeta_{m_{\tau i}}}{\theta}\sin\theta & \dfrac{\xi_{m_{\tau i}}\zeta_{m_{\tau i}}}{\theta^2}(1-\cos\theta) + \dfrac{\psi_{m_{\tau i}}}{\theta}\sin\theta \\ \dfrac{\psi_{m_{\tau i}}\xi_{m_{\tau i}}}{\theta^2}(1-\cos\theta) + \dfrac{\zeta_{m_{\tau i}}}{\theta}\sin\theta & \dfrac{\psi_{m_{\tau i}}^2}{\theta^2}(1-\cos\theta) + \cos\theta & \dfrac{\psi_{m_{\tau i}}\zeta_{m_{\tau i}}}{\theta^2}(1-\cos\theta) - \dfrac{\xi_{m_{\tau i}}}{\theta}\sin\theta \\ \dfrac{\zeta_{m_{\tau i}}\xi_{m_{\tau i}}}{\theta^2}(1-\cos\theta) - \dfrac{\psi_{m_{\tau i}}}{\theta}\sin\theta & \dfrac{\zeta_{m_{\tau i}}\psi_{m_{\tau i}}}{\theta^2}(1-\cos\theta) + \dfrac{\xi_{m_{\tau i}}}{\theta}\sin\theta & \dfrac{\zeta_{m_{\tau i}}^2}{\theta^2}(1-\cos\theta) + \cos\theta \end{bmatrix} \quad (5)$$

where the following expression (6) holds.

$$\theta = \sqrt{\xi_{m_{\tau i}}^2 + \psi_{m_{\tau i}}^2 + \zeta_{m_{\tau i}}^2} \quad (6)$$

The sign $R_{SC}(\omega_{SC})$ denotes a three-by three rotation matrix representing local-transform determined based on an expression $(\omega_{SC}) = [\xi \ \psi \ \zeta]^T$ and is defined by an expression obtained by removing the suffix letters $m_{\tau i}$ from Expression 5.

At step S2090, the calibration-information calculation unit 160 calculates an error $$\Delta u_i^{Q_{ki}'}$$

between the actual image coordinates $$u_i^{Qki}$$

of the reference index Qki included in the data shown in the data list L and the theoretical value $$u_i^{Qki'}$$

of the image coordinates corresponding to the actual image coordinates $u_i^{Qki}$ for each of the entire indices i according to the following expression (7):

$$\Delta u_i^{Q_{ki}} = u_i^{Q_{ki}} - u_i^{Q_{ki}'} \quad (7)$$

At step S2100, the calibration-information calculation unit 160 calculates an image Jacobian $$J_{uis}^{Qki}(=\partial u_i^{Qki}/\partial s),$$

relating to the state vector s for each of the entire indices i. The image Jacobian denotes a Jacobian matrix that has two rows and (3+4T) columns and that has solutions obtained by partial-differentiating a function $F_{\tau i}$ shown in Expression 1 with respect to each of elements of the state vector s, as elements. More specifically, the calibration-information calculation unit 160 calculates a Jacobian matrix $$J_{uixCi}^{Qki} = \partial u_i^{Qki}/\partial x_{Ci}^{Qki}$$

that has two rows and three columns. The Jacobian matrix $J_{uixCi}^{Qki}$ has solutions obtained by partial-differentiating the right side of Expression 3 with respect to each of the elements of the position vector $x_{Ci}^{Qki}$ on the camera-coordinate system, as elements. Further, the calibration-information calculation unit 160 calculates a Jacobian matrix $J_{xCis}^{Qki}(=\partial x_{Ci}^{Qki}/\partial s)$ that has three rows and (3+4T) columns. The Jacobian matrix $J_{xCis}^{Qki}$ has solutions obtained by partial-differentiating the right side of Expression 2 with respect to each of the elements of the state vector s, as elements. Then, the calibration-information calculation unit 160 calculates the image Jacobian $J_{uis}^{Qki}$ according to the following expression (8):

$$J_{u_i s}^{Q_{k_i}} = J_{u_i x_{Ci}}^{Q_{k_i}} \cdot J_{x_{Ci}s}^{Q_{k_i}} \quad (8)$$

At step S2110, the calibration-information calculation unit 160 calculates a correction value Δs of the state vector s based on the error $\Delta u_i^{Qki}$ obtained for each of the entire indices i and the Jacobian matrix $J_{uis}^{Qki}$ that are calculated by following the above-described steps. More specifically, the calibration-information calculation unit 160 generates an error vector of a 2I-dimensional vector obtained by aligning the errors $\Delta u_i^{Qki}$ calculated for the entire indices i in a vertical direction. The error vector is shown by the following expression (9):

$$U = \begin{bmatrix} \Delta u_1^{Q_{k_1}} \\ \Delta u_2^{Q_{k_2}} \\ \vdots \\ \Delta u_I^{Q_{k_I}} \end{bmatrix} \quad (9)$$

Further, the calibration-information calculation unit 160 generates a matrix having 2I rows and (3+4T) columns including the Jacobian matrices $J_{uis}^{Qki}$ that are aligned in a vertical direction. The matrix is shown by the following expression (10):

$$\Phi = \begin{bmatrix} J_{u_1 s}^{Q_{k_1}} \\ J_{u_2 s}^{Q_{k_2}} \\ \vdots \\ J_{u_I s}^{Q_{k_I}} \end{bmatrix} \quad (10)$$

Then, the calibration-information calculation unit 160 calculates the correction value Δs by using a pseudo-inverse matrix $\Phi^+$ of the matrix Φ, according to the following expression (11):

$$\Delta s = \Phi^+ U \quad (11)$$

The correction value Δs can be calculated, where at least three reference indices are detected on two photographed images, since the correction value Δs is a (3+4T)-dimensional vector (the unknown-parameter number 3+4×2=11<the expression number 2×3×2=12). Though the pseudo-inverse matrix $\Phi^+$ can be obtained according to an expression $\Phi^+ = (\Phi^T \Phi)^{-1} \Phi^T$, it may be obtained according to another method.

At step S2120, the calibration-information calculation unit 160 corrects the state vector s according to Expression 12 by using the correction value Δs calculated, at step S2110, and determines the obtained value, as a new state vector s.

$$s + \Delta s \to s \quad (12)$$

At step S2130, the calibration-information calculation unit 160 determines whether or not the calculation converges according to a determination criterion of some kind, for example, whether or not the error vector U is smaller than a predetermined threshold value, or whether or not the correction value Δs is smaller than another predetermined threshold value. If the calculation does not converge (no at step S2130), the calibration-information calculation unit 160 performs processing procedures from step S2080 to step S2130 by using the corrected state vector s, as an initial value.

Where it is determined that the calculation converged (yes at step S2130), processing proceeds to step S2140 and the calibration-information calculation unit 160 externally transmits the vector $\omega_{SC}$ included in the obtained state vector s, as a parameter indicating the local-transform. Further, the calibration-information calculation unit 160 may also externally transmit $\alpha_T$, as a parameter indicating the latest azimuth-drift-error correction value, and the position $t_{WCT}$ of the image-pickup device 120.

Finally, at step S2150, it is determined whether or not the calibration processing should be finished. If the operator instructs the sensor-calibration device 100 to finish the calibration processing (yes at step S2150), the processing is finished. If the operator instructs the sensor-calibration device 100 to continue performing the calibration processing (recalibration) (no at step S2150), the calibration-information calculation unit 160 returns to step S2010 and waits until another data-acquisition command is transmitted.

According to the above-described processing, the orientation of the orientation sensor 110 mounted on the image-pickup device 120 with reference to the image-pickup device 120 can be obtained with ease and precision. Further, after the above-described processing is performed, in the image-pickup device 120 according to this embodiment, the mixed reality is presented through the position-and-orientation calculation unit 170, the image-generation unit 180, the image-synthesis unit 190, and the image-display unit 1100 by using parameters indicating the calibrated local-transform and the latest azimuth-drift error, so as to verify the above-described parameters. Since the technology for presenting the mixed reality is known, the description thereof is omitted.

According to the above-described processing, the orientation of the orientation sensor 110 mounted on the image-pickup device 120 with reference to the image-pickup device 120 can be obtained with ease and precision.

Modification Example

In the above-described embodiment, a point feature, that is, the image coordinates of a single point representing the projection image of a reference index is used, as a feature amount relating to the image coordinates of the reference index. Further, an index that can extract the above-described point feature is used, as the reference index Q. However, the scope of the present invention is not limited to the type of reference indices and the type of feature amounts relating to image coordinates of the reference index.

For example, the present invention may use a line feature used for known position-and-orientation measurement devices (refer to "D. G. Lowe: Fitting parameterized three-dimensional models to images, IEEE Transactions on PAMI, vol. 13, no. 5, pp. 441 to 450, 1991.", for example), as the feature amount relating to the image coordinates of the reference index and an index that can extract the line feature (hereinafter referred to as a line index), as a reference index. For example, an error vector U is generated by an error $\Delta d$ calculated from a value d detected from an image and a value d* estimated from the state vector s by using a linear distance from the origin point, as the reference for performing the error evaluation. Further, a matrix $\Phi$ is generated by using a Jacobian matrix $J_{dS}(=\partial d/\partial s)$ that has a single row and (3+4T) columns and that has solutions obtained by partial-differentiating the expression for calculating the value d* with respect to the elements of the state vector s, as elements. Subsequently, the sensor-calibration device can deduce the local-transform in a manner similar to that of the above-described embodiment. Furthermore, the sensor-calibration device can use the line indices and point indices in conjunction with the above-described parameters.

OTHER EMBODIMENTS

A storage medium (or a recording medium) storing program code of software for implementing the functions of the above-described embodiments may be supplied to a system or an apparatus so that a computer (CPU, MPU (micro-processing unit), etc.) of the system and the apparatus reads and executes the program code stored in the storage medium. In that case, the program code itself, read from the storage medium, achieves the functions of the above-described embodiments. Furthermore, not only by the computer reading and executing the program code, but also by an operating system (OS), etc. running on the computer based on instructions of the program code, where the OS executes part of or the entire process, the functions of the above-described embodiments may be achieved.

In another embodiment of the present invention, the program code read from the storage medium may be written into a memory of a function extension card inserted in the computer or a function extension unit connected to the computer. After that, the functions of the above-described embodiments may be realized by executing part of or the entire process by a CPU, etc. of the function extension card or the function extension unit based on instructions of the program code.

When the present invention is applied to the above-described storage medium, the storage medium stores program code corresponding to the above-described flowchart shown in FIG. 2.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-144783 filed May 14, 2004, which is hereby incorporated by reference herein.

What is claimed is:

1. An information-processing method for calibrating an orientation sensor mounted on an image-pickup device, the information-processing method comprising steps of:
    inputting an image photographed by the image-pickup device;
    inputting an orientation-measurement value measured by the orientation sensor;
    detecting image coordinates of indices from the photographed image;
    calculating, theoretical values of the image coordinates of the indices by using the orientation-measurement value, the detected image coordinates of the indices, and estimates of unknown parameters including at least a position of the image-pickup device and an orientation of the orientation sensor relative to the image-pickup device; and
    correcting the estimates of unknown parameters based on errors between actual-measured values of the image coordinates of the indices and the theoretical values of the image coordinates of the indices calculated from the estimates of unknown parameters.

2. A program stored in a computer readable medium for making a computer execute the information-processing method according to claim 1.

3. The information-processing method according to claim 1,
    wherein, in the steps of inputting the photographed image and inputting the orientation-measured value, in a predetermined time period where the image-pickup device is placed on each of a plurality of viewpoints, the photographed image and the orientation-measured value are input for each of the viewpoints,
    wherein, in the detection step, the image coordinates of the indices are detected from each of the photographed images,
    wherein, in the step of calculating the theoretical values of the image coordinates of the indices, by treating at least the position of the image-pickup device at each of the plurality of viewpoints and the relative orientation between the orientation sensor and the image-pickup device as the unknown parameter, the unknown parameters are estimated based on the image coordinates of the indices detected for each of the photographed images and each of the orientation-measured values.

4. A program stored in a computer readable medium for making a computer execute the information-processing method according to claim 3.

5. The information-processing method according to claim 3, wherein, in the step of calculating the theoretical values of the image coordinates of the indices, a parameter relating to an azimuth-drift-error correction value of the orientation sensor at each of the plurality of viewpoints is further treated as the unknown parameters.

6. A program stored in a computer readable medium for making a computer execute the information-processing method according to claim 5.

7. The information-processing method according to claim 1, wherein, in the step of calculating the theoretical values of the image coordinates of the indices, a parameter relating to an azimuth-drift-error correction value of the orientation sensor is further treated as the unknown parameters.

8. A program stored in a computer readable medium for making a computer execute the information-processing method according to claim 7.

9. An information-processing system for calibrating an orientation sensor mounted on an image-pickup device, the information-processing system comprising:

a photographed-image input unit for inputting an image photographed by the image-pickup device;

an orientation-measurement-value input unit for inputting an orientation-measurement value measured by the orientation sensor;

a detection unit for detecting image coordinates of indices from the photographed image;

a theoretical image coordinates calculation unit for calculating theoretical values of the image coordinates of the indices by using the orientation-measurement value and the detected image coordinates of the indices, and estimates of unknown parameters including at least a position of the image-pickup device and an orientation of the orientation sensor relative to the image-pickup device; and a correction unit for correcting the estimates of unknown parameters based on errors between actual-measured values of the image coordinates of the indices and the theoretical values of the image coordinates of the indices calculated from the estimates of unknown parameters.

10. The information-processing system according to claim 9, wherein the image-pickup device is mounted on a head.

11. The information-processing system according to claim 9, wherein the image-pickup device includes an image-display unit.

12. The information-processing system according to claim 9, further comprising:

a position-and-orientation calculation unit for calculating a position and an orientation of the image-pickup device by using the orientation-measurement value, the detected information about the image coordinates of the index, and the calculated relative orientation;

an image-generation unit for generating a virtual image based on the calculated position and orientation of the image-pickup device;

an image-synthesis unit for merging the inputted photographed image and the generated virtual image; and an image-display unit for displaying the merged image.

* * * * *